(12) United States Patent
Amundson

(10) Patent No.: US 6,842,279 B2
(45) Date of Patent: Jan. 11, 2005

(54) ILLUMINATION SYSTEM FOR NONEMISSIVE ELECTRONIC DISPLAYS

(75) Inventor: Karl R. Amundson, Cambridge, MA (US)

(73) Assignee: E Ink Corporation, Cambridge, MA (US)

( * ) Notice: Subject to any disclaimer, the term of this patent is extended or adjusted under 35 U.S.C. 154(b) by 0 days.

(21) Appl. No.: 10/607,703

(22) Filed: Jun. 27, 2003

(65) Prior Publication Data

US 2004/0008398 A1 Jan. 15, 2004

Related U.S. Application Data

(60) Provisional application No. 60/392,107, filed on Jun. 27, 2002.

(51) Int. Cl.$^7$ ............................ G02B 26/00; G09G 3/34
(52) U.S. Cl. ......................... 359/296; 359/297; 345/107
(58) Field of Search ................................ 359/296, 253, 359/254, 266, 295, 297; 345/107

(56) References Cited

U.S. PATENT DOCUMENTS

| | | | | |
|---|---|---|---|---|
| 4,126,854 A | * | 11/1978 | Sheridon | 345/107 |
| 5,067,021 A | | 11/1991 | Brody | 348/383 |
| 5,194,852 A | | 3/1993 | More et al. | 345/182 |
| 5,808,783 A | * | 9/1998 | Crowley | 359/296 |
| 5,917,646 A | * | 6/1999 | Sheridon | 359/296 |
| 5,930,026 A | * | 7/1999 | Jacobson et al. | 359/296 |
| 5,975,680 A | | 11/1999 | Wen et al. | 347/43 |
| 6,130,773 A | | 10/2000 | Jacobson et al. | 359/296 |
| 6,376,828 B1 | | 4/2002 | Comiskey | 250/216 |
| 6,480,322 B2 | * | 11/2002 | Engler et al. | 359/296 |
| 2003/0076573 A1 | * | 4/2003 | Gates et al. | 359/245 |

FOREIGN PATENT DOCUMENTS

| | | |
|---|---|---|
| WO | WO 98/19208 | 5/1998 |
| WO | WO 99/41732 | 8/1999 |
| WO | WO 99/41788 | 8/1999 |
| WO | WO 00/20923 | 4/2000 |

OTHER PUBLICATIONS

Comiskey et al.; 7.4L: Late–News Paper: Electrophoretic Ink: A Printable Display Material: Jan. 1, 1997; 75–76; SID 97 Digest.

Drzaic et al; A Printed and Rollable Bistable Electronic Display; Jan. 1, 1998; 1131–34; 1998 SID International Symposium, Digest of Technical Papers; 29.

Saitoh et al; A Newly Developed Electrical Twisting Ball Display; Jan. 1, 1982; 249–53; Proceedings of the SID; 23(4).

Shiwa et al.; 5–6; Electrophoretic Display Method Using Ionographic Technology; Jan. 1, 1988; 61–62; SID 88 Digest.

* cited by examiner

Primary Examiner—Georgia Epps
Assistant Examiner—M. Hasan
(74) Attorney, Agent, or Firm—Testa, Hurwitz & Thibeault, LLP

(57) ABSTRACT

A frontlighting illumination system for selectively illuminating a nonemissive electronic display includes display elements in communication with at least one light source. The electronic display includes a nonemissive electro-optic medium; and a light transmissive element. Light transmitted through the light transmissive element illuminates the display medium. The propagation of light that is directed through the light transmissive element towards the microencapsulated electrophoretic display medium is substantially undeflected at the interface between the surface of the light transmissive element and the microencapsulated electrophoretic display medium. A reflector is included for directing light from the light source through the light transmissive element.

95 Claims, 6 Drawing Sheets

ILLUMINATION SYSTEM FOR NONEMISSIVE ELECTRONIC DISPLAYS

CROSS-REFERENCE TO RELATED APPLICATIONS

This application claims priority to and the benefit of U.S. Provisional Application Ser. No. 60/392,107 filed Jun. 27, 2002, the entire disclosure of which is incorporated herein by reference.

FIELD OF THE INVENTION

The present invention relates to a system for illuminating nonemissive electronic displays, and, more specifically, to a system for frontlighting a microencapsulated electrophoretic display.

BACKGROUND OF THE INVENTION

The recent advent of nonemissive electronic display technologies allows the manufacture of inexpensive displays having low power consumption requirements. These displays have uses in a variety of applications such as advertising, information dissemination, education, and entertainment. Because these displays are nonemissive, their effectiveness is limited to daytime use or to use in lit rooms. An illumination system that selectively illuminates the display medium of such a display system is therefore desired.

Traditional displays, such as, for example, liquid crystal displays, are typically are illuminated using backlighting. In backlit displays, light from a light source passes through the back of the display via a light transmissive element, such as a light pipe, and is perceived by a viewer. This type of illumination can be used with liquid crystal displays because light can effectively pass through the display medium. However, the utility of using backlighting with a nonemissive display, such as a microencapsulated electrophoretic display or rotating ball display, is limited because the display medium of such displays is effectively opaque, thus acting as a barrier to light. In addition, various elements used to increase the uniformity of light passing through the light transmissive element, such as diffusers, decrease the amount of light ultimately reaching the viewer.

Conversely, the design of a frontlighting system for illuminating reflective displays requires a trade-off between achieving uniform illumination of the display and minimizing undesirable reflection of light away from the display and towards the viewer, which lightens the dark state of the display and reduces its perceived contrast.

A common frontlighting scheme uses a plastic sheet that covers the display area. Light enters the front light sheet from the side, either from a tubular lamp or a microstructured light bar that diffuses light into the sheet from a point source lamp. The light then propagates across the sheet by total internal reflection, bouncing off the surfaces of the light sheet many times. Surface elements, e.g. micropatterns, such as serrated edges, pyramids, grooves, and others, are used to direct a fraction of the internally reflected light down through the display. Typically, these light-deflecting features make the light's angle of approach to the display steeper. The density of the deflecting features is usually graded across the display in order to compensate for the loss of intensity with distance from the source, thus achieving nearly uniform illumination of the display surface. These systems, however, generally suffer from backscattering because of the addition of two surfaces between the display medium and the viewer, i.e. the front and back surfaces of the front light sheet, as well as because of the micropatterns and other surface elements disposed on one of the surfaces of the front light sheet.

SUMMARY OF THE INVENTION

It is the object of the invention to facilitate frontlighting of a nonemissive electronic display with minimal undesirable reflection of light away from the display and towards the viewer.

This invention takes advantage of the observation that for nonemissive display technologies, such as encapsulated electrophoretic medium or rotating ball displays, light from nearly all angles of incidence can be efficiently scattered or absorbed resulting. In fact, for such displays, scattering is substantially Lambertian, so the intensity of scattered light reaching a viewer is nearly independent of the angle of incidence, allowing illumination come in from the light transmissive element to the display medium over a wide range of incidence angles.

Accordingly, the present invention is directed to an illumination system adapted to selectively illuminate an electronic display, and, in particular, features a nonemissive electro-optic display medium in combination with a frontlighting illumination system. The illumination system according to the present invention can be used to selectively illuminate multi-character displays having a variety of shapes.

In general, in one aspect, the invention features an electronic display that includes a nonemissive electro-optic display medium and a light transmissive element. A first surface of the light transmissive element is adjacent the nonemissive electro-optic display medium. The propagation of light directed through the light transmissive element towards the nonemissive electro-optic display medium is substantially undeflected at the interface between the first surface and the nonemissive electro-optic display medium.

In some embodiments of this aspect of the invention, the nonemissive display also includes a light source disposed in optical communication with the light transmissive element for generating light for transmission through the light transmissive element. Further, in some variations of these embodiments, the invention features a reflector for directing light from the light source through the light transmissive element. The reflector may have a non-planar surface of predetermined configuration for facilitating substantially uniform illumination of the nonemissive electro-optic display medium. The surface of the reflector may include a plurality of surface elements.

In general, in another aspect, the invention features an electronic display that includes a nonemissive electro-optic display medium and a light transmissive element having a first surface. The first surface of the light transmissive element is adjacent the nonemissive electro-optic display medium. The electronic display according to this aspect of the invention further includes a light source in optical communication with the light transmissive element, and a reflector for directing light from the light source through the light transmissive element. The reflector is configured to facilitate substantially uniform illumination of the nonemissive electro-optic display medium, and, optionally, has a non-planar surface of predetermined configuration. Also, the surface of the reflector may include a plurality of surface elements.

Various embodiments of the foregoing aspects of the invention include the following features. Examples of suitable nonemissive electro-optic display medium include an electrochromic display medium, microcell electrophoretic display medium, and rotating bichromal member display medium. In a particular embodiment, the nonemissive electro-optic display medium is a microencapsulated electrophoretic display medium, for example, the microencapsulated electrophoretic display medium including at least one capsule dispersed in a binder phase. Such capsule contains an electrophoretic contrast medium phase that includes at least one particle and suspending fluid.

Also, examples of suitable light sources for use in the illumination system of the invention include a cold cathode fluorescent lamp, an SMT incandescent lamp, and a light emitting diode. The light source may be coupled to a photodetector, and be activated when the level of ambient light drops below a predetermined value.

In various embodiments of the invention, the first surface of the light transmissive element is substantially planar and/or substantially void of surface elements. Also, the first surface of the light transmissive element may include an electrically conductive coating, such as, for example, a coating including indium tin oxide.

In some embodiments, the nonemissive electro-optic display medium includes a binder phase having a first index of refraction that substantially equals to a second index of refraction of the light transmissive element. A second surface of the light transmissive element that is opposite to the first surface may include a reflective coating for internal reflection of light towards the microencapsulated electrophoretic display medium.

Further, a substantially transparent substrate may be disposed between the light transmissive element and the nonemissive electro-optic display medium. The substrate optionally includes an electrically conductive coating at the interface with the nonemissive electro-optic display medium. In a particular variation, the substrate has an index of refraction that substantially equals the index of refraction of the light transmissive element.

Also, the light transmissive element may include a first component having a first surface; and a second component having a second surface. The first surface mates with the second surface so that the first component and the second component form a lens at the interface therebetween for facilitating substantially uniform illumination of the nonemissive electro-optic display medium. In one variation, the first component and the second component have dissimilar indices of refraction. In other variations, a light conduit, optionally having a lens internally formed therein, is disposed between the light source and the reflector.

BRIEF DESCRIPTION OF THE DRAWINGS

The foregoing and other objects, features, and advantages of the present invention, as well as the invention itself, will be more fully understood from the following description of preferred embodiments when read together with the accompanying drawings, in which.

DETAILED DESCRIPTION

Figure 1:
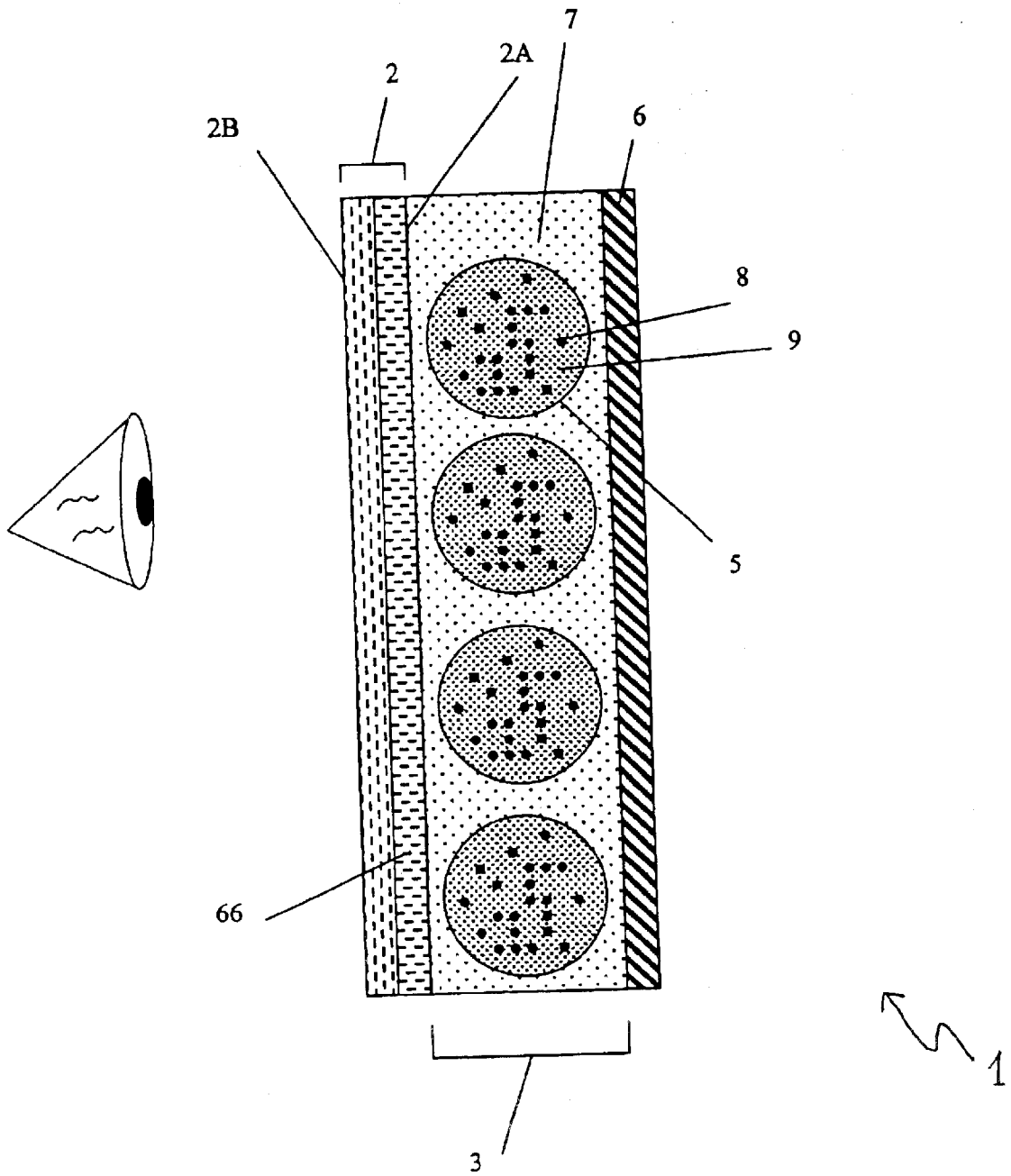
FIG. 1 shows a schematic representation of a cross-sectional view of a nonemissive electronic display.

Referring now to FIG. 1, and in brief overview, an illuminated nonemissive electronic display 1 comprises a substrate 2 having a first surface 2a and a second surface 2b. A display medium 3 is disposed adjacent the first surface 2a and includes nonemissive display elements 5 having electrically-responsive optical properties, as discussed in more detail below. A front electrode 66 and a back electrode 6 bound the display medium 3. The back electrode 6 may be patterned electrode which selectively alters the optical properties of the display elements 5 in the display medium 3, generating displays of images and/or text, (moving or still) in response to voltages selectively applied to different areas of the display medium 3.

Throughout the specification, reference will be made to printing or printed. As used throughout the specification, printing is intended to include all forms of printing and coating, including: premetered coatings such as patch die coating, slot or extrusion coating, slide or cascade coating, and curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; and other similar techniques. A "printed element" refers to an element formed using any one of the above techniques.

Display Medium
Display Elements

Several types of nonemissive electro-optic display media are known. The display medium according to the embodiments of the present invention includes nonemissive display elements such as, for example, particles, particle-containing capsules (e.g., microencapsulated electrophoretic display elements), particle-containing microcells, bichromal spheres or cylinders, or rotating bichromal members. Still referring to FIG. 1, in an illustrative embodiment, the nonemissive display elements 5 of the nonemissive electro-optic display medium 3 are dispersed in a binder 7.

One type of electro-optic display is a rotating bichromal member type display described, for example, in U.S. Pat. Nos. 5,808,783; 5,777,782; 5,760,761; 6,054,071 6,055,091; 6,097,531; 6,128,124; 6,137,467; and 6,147,791, the disclosures of which are incorporated herein by reference. Although this type of display is often referred to as a "rotating bichromal ball" display, the term "rotating bichromal member" is preferred as more accurate since in some of the patents identified above the rotating members are not spherical. Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed to applying an electric field thereto, thus rotating the bodies to various positions and varying which of the sections of the bodies is seen through a viewing surface.

Another type of a nonemissive electro-optic display is a so-called "microcell electrophoretic display." In a microcell electrophoretic display, the charged particles and the suspending fluid are not encapsulated within capsules but instead are retained within a plurality of cavities formed within a carrier medium, typically a polymeric film. See, for example, International Application Publication No. WO 02/01281, and published U.S. application Ser. No. 2002-

0075556, both assigned to Sipix Imaging, Inc, the disclosures of which are incorporated herein by reference.

Yet another type of a nonemissive display is an electrochromic display, for example, an electrochromic medium in the form of a nanochromic film including an electrode formed at least in part from a semiconducting metal oxide and a plurality of dye molecules capable of reversible color change attached to the electrode, as described, for example, in articles by O'Regan et al., Nature 1991, 353, 737; and Wood, Information Display, 18(3), 24 (March 2002), both incorporated herein by reference. Nanochromic films of this type are also described, for example, in U.S. Pat. No. 6,301,038 and International Application Publication No. WO 01/27690, also incorporated herein by reference.

In a particular embodiment of the invention shown in FIG. 1, the nonemissive electro-optic display medium is a microencapsulated electrophoretic display medium 3 whose display elements are particle-containing capsules 5. The capsules 5 can be of any size or shape. In one variation, the capsules 5 are spherical and have diameters in the millimeter or micron range. In a particular variation, the capsule diameters range from about ten to a few hundred microns. The capsules 5 may be formed by an encapsulation technique and, in one embodiment, include two or more different types of electrophoretically mobile particles 8.

The particles 8 contained within the capsules 5 may be colored, luminescent, light-absorbing, light-scattering, or transparent, and may come in a variety of regular or irregular shapes. Suitable particle materials include, but are not limited to, neat pigments, dyed (laked) pigments and pigment/polymer composites. In one embodiment, suitable types of particles include scattering pigments, absorbing pigments and luminescent particles. In another embodiment, the particles are transparent. Exemplary particles include titania, which may be coated in one or two layers with a metal oxide, such as aluminum oxide or silicon oxide. Exemplary types of luminescent particles comprise zinc sulfide, which may be further encapsulated with an insulative coating to reduce electrical conduction. Light-blocking or absorbing particles, such as dyes or pigments, are also encompassed within the scope of the invention. Types of dyes for use in electrophoretic displays are commonly known in the art.

In one embodiment of the invention, the particles 8 are dispersed in a suspending fluid 9 within the capsules 5. The suspending fluid 9 may be a high resistivity fluid. The suspending fluid 9 may be a single fluid, or a mixture of two or more fluids. In one embodiment of the invention, the suspending fluid is a halogenated hydrocarbon, such as tetrachloroethylene. The halogenated hydrocarbon may also be a low molecular weight polymer. One such low molecular weight polymer is poly(chlorotrifluoroethylene). The degree of polymerization for this polymer range from about 2 to about 10. The suspending fluid may also include a dye to provide colored display elements 5. Useful dyes are typically soluble in the suspending fluid, and may further be part of a polymeric chain. Dyes may be polymerized by thermal, photochemical, and chemical diffusion processes. Single dyes or mixtures of dyes may also be used.

The primary optical effect in a microencapsulated electrophoretic display device is the controlled positioning of one or more types of colloidal particles within a microcapsule. In one embodiment, colloidal particles are suspended in a colored fluid within the microcapsule. Application of an electrical signal will drive the particles to one side of the microcapsule or the other. If the colloidal particles are near the side of the microcapsule nearer the viewer, the viewer will see the color of the colloid. If the colloidal particles are nearer the opposite side of the microcapsule from the viewer, the viewer will see the colored fluid. The contrast between the colors of the fluid and the colloid, based on the colloid position, provides the means for a display device. The position of the colloid can be controlled by application of electrical signals to electrodes built into the display. Additionally, it is possible to control the position of the colloid using an externally provided voltage signal (electrostatic writing). The display can be devised to work primarily by application of a field to electrodes, by electrostatic writing, or with both.

Further, different types of particles 8 may be suspended in the suspending fluid 9. In one embodiment, the suspending fluid 9 comprises a plurality of anisotropic particles and a plurality of second particles. Application of a first electric field causes the anisotropic particles to assume a specific orientation and present an optical property. Application of a second electric field then causes the plurality of second particles to translate, thereby disorienting the anisotropic particles and disturbing the optical property. Alternatively, the orientation of the anisotropic particles may allow easier translation of the plurality of second particles.

A microencapsulated electrophoretic display using particle-containing capsules can be constructed so that the optical state of the display is stable for some length of time. In this embodiment, the particles 8 are suspended in the suspending fluid 9 (either a single fluid or a mixture of fluids) whose density is substantially matched to that of the particles 8. A stable display medium 3 is generated because the particles 8 will not move in the suspending fluid 9 absent an electric field applied via electrodes 66 and 6.

When the display has two states that are stable in this manner, the display is bistable. If more than two states of the display are stable, then the display is multistable. For the purpose of the present invention, the term bistable indicates a display in which any optical state remains fixed once an addressing voltage is removed. However, the definition of a bistable state depends upon the display's application. A slowly decaying optical state can be effectively bistable if the optical state is substantially unchanged over the required viewing time. For example, in a display that is updated every few minutes, a display image that is stable for hours or days is effectively bistable for a particular application. Thus, for purposes of the present invention, the term bistable also indicates a display with an optical state sufficiently long-lived so as to be effectively bistable for a particular application. Alternatively, it is possible to construct encapsulated electrophoretic displays in which the image decays quickly once the addressing voltage to the display is removed (i.e., the display is not bistable or multistable).

Binder

Still referring to FIG. 1, in some embodiments of the invention, the display medium 3 includes a binder 7 that surrounds display elements 5 and separates the electrodes 66, 6. Materials for use as binders 7 include, but are not limited to, water-soluble polymers, water-dispersed polymers, oil-soluble polymers, thermoset polymers, thermoplastic polymers, and UV- or radiation-cured polymers. In one embodiment, the binder material 7 is compatible with the display elements 5 and front and back electrodes 66 and 6, allowing for facile printing or coating. In another embodiment of the invention, the binder 7 possesses barrier properties for water, oxygen, ultraviolet light, an electrophoretic fluid, or other materials. Further, the binder 7 may contain surfactants and cross-linking agents to improve coating properties and to increase the durability of the display.

In some embodiments, the encapsulation step of the process mentioned above is not necessary, and the electrophoretic fluid may be directly dispersed or emulsified into the binder (or a precursor to the binder materials) to form what may be effectively called a "polymer-dispersed electrophoretic display." In such displays, voids created in the binder or the individual electrophoretic phases may be referred to as capsules or microcapsules even though no capsule membrane per se is present. Such polymer-dispersed electrophoretic display may be of the emulsion or phase separation type, and are considered to be subsets of encapsulated electrophoretic displays.

For successful construction of an encapsulated electrophoretic display medium 3, it is desirable that polymeric binders, capsule membranes, particles, and suspending fluids be chemically compatible. The capsule membranes may engage in useful surface interactions with the electrophoretic particles, or may act as an inert physical boundary between the fluid and the binder 7. Also, polymer binders may serve as adhesives between capsule membranes and the electrode surfaces. Finally, the degree of stability of the display medium 3 can be controlled through appropriate chemical modification of the electrophoretic particles, the suspending fluid, the capsules, and binder materials and through the interactions of these components.

Electrodes

With continued reference to FIG. 1, as mentioned above, the display medium 3 is bound or "sandwiched" between a front electrode 66 and a back electrode 6. In response to an electric field generated by the front electrode 66 and back electrode 6, the display elements 5 within the display medium 3 change their optical states. In various embodiments of the invention, the back electrode 6 is a patterned electrode used to selectively address the display elements 5 within the display medium 3, generating displays of images and/or text (moving or still) in response to voltages selectively applied to different areas of the display medium 3.

In one embodiment of the invention, as shown in FIG. 1, the back electrode 6 is adjacent to the display medium 3. In a further embodiment, the back electrode 6 contacts the display medium 3. The back electrode 6 may be disposed on a back electrode substrate, or it may be printed onto and part of back electrode substrate. The front electrode 66 may also be disposed on the first surface 2a of substrate 2, or may be printed onto, adhered to, or be integral part of, the substrate 2.

When the display medium 3 comprises particle-containing capsules 5 (e.g., as in a microencapsulated electrophoretic display), the particles may be oriented or translated by placing an electric field across the capsule. The electric field may include an alternating-current field or a direct-current field. Particle-containing capsules may be addressed by DC voltages, drawing very little current. In this embodiment, electrodes 66 and 6 can be of relatively high resistivity. The ability to use resistive conductors substantially widens the number and types of materials that can be used. In particular, the use of costly vacuum-sputtered indium tin oxide (ITO) conductors, a typical material used in liquid crystal display devices, is not required. Aside from the cost savings, replacing ITO with other materials can provide benefits in appearance, processing capabilities (e.g. ability to print conductors more easily), flexibility, and durability. Additionally, when printed electrodes are used, these are in contact only with a solid binder and not with a fluid layer (such as a fluid comprising liquid crystals). This means that some conductive materials, which would otherwise dissolve or be degraded by contact with liquid crystals, can be used.

In some embodiments, conductive materials that form the front electrode 66 are at least partially transparent. Examples of suitable conductive materials include indium tin oxide and polyaniline. Also, electroconductive powders, for example, Zelec® electroconductive powders, available from DuPont Chemical Co. of Wilmington, Del., may also be used to create transparent electrodes. Because high conductivity requirements are not as stringent as with conventional, e.g. liquid crystal, displays, the electrode layers can be made thinner and more transparent than with traditional displays.

Conductive materials used for back electrode 6 may be either transparent or opaque. Suitable conductive materials for back electrode 6 include opaque metallic inks, such as silver and graphite inks. Organic conductors, such as polymeric conductors and molecular organic conductors may also be used. Suitable materials for polymeric conductors include, but are not limited to, polyaniline and derivatives, polythiophene and derivatives, poly 3,4-ethylenedioxythiophene (PEDOT) and derivatives, polypyrrole and derivatives, and polyphenylenevinylene (PPV) and derivatives. Suitable materials for organic molecular conductors include, but are not limited to, derivatives of naphthalene, pthalocyanine, and pentacene.

Illumination System

Figure 2:
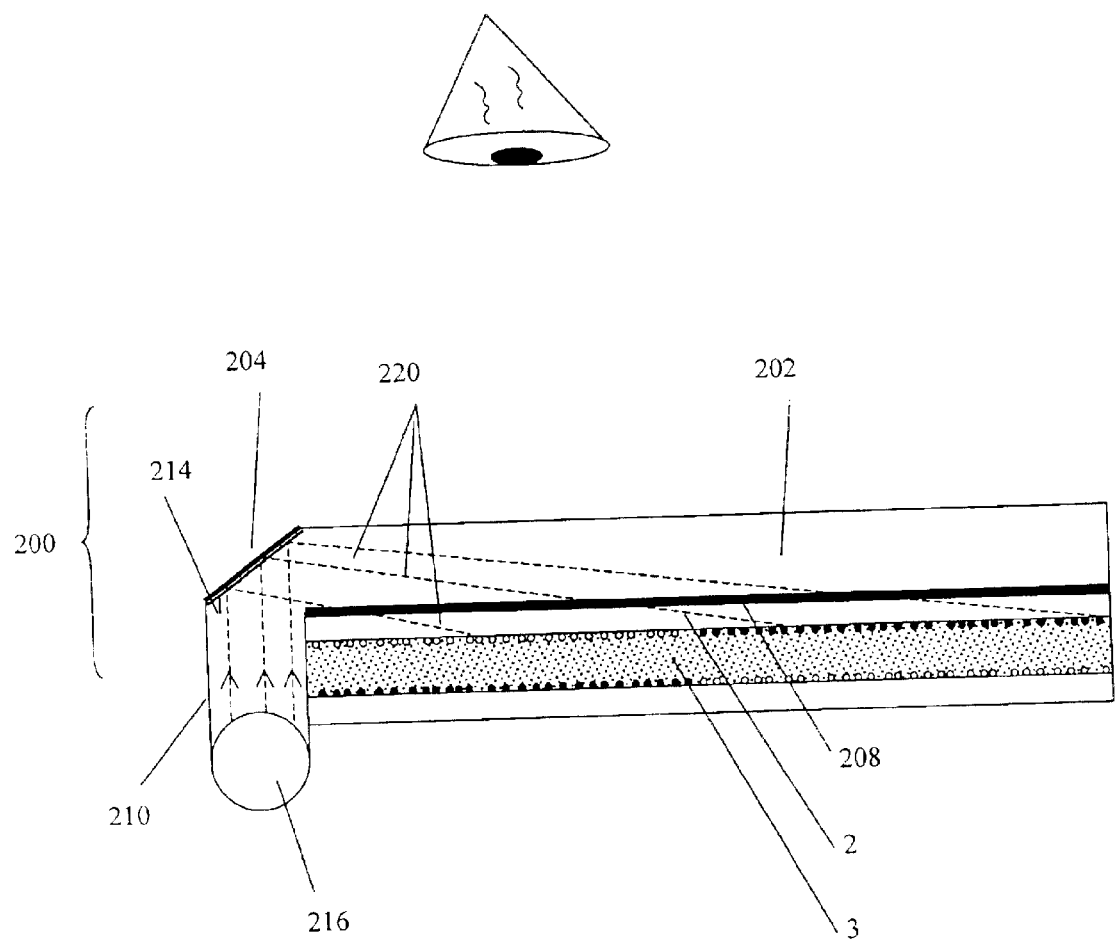
FIG. 2 depicts one embodiment of a frontlighting system.

Referring to FIG. 2, in one embodiment, a frontlighting system 200 for use in connection with nonemissive displays described above includes a light transmissive element, such as, for example, a layer 202.

In various embodiments of the invention, propagation of light beams 220 directed through the light transmissive element towards the nonemissive display medium is substantially undeflected along the path of the light beams, and, particularly, at one or more interfaces between the light transmissive element and the display medium.

In one embodiment of the invention, the layer 202 has a refractive index ($n_L$) that is either less than the refractive index of the substrate 2 ($n_S$) or substantially equals to it. The refractive index ratio $n_L/n_S$ may range from about 1.3 to 0.95, preferably, from about 1.1 to about 1.0, and, more preferably, from 1.03 to 1. An adhesive 208 having a refractive index that matches the layer 202 and/or the substrate 2 may be used to adhere the layer 202 to the substrate 2. In a particular embodiment, the index or refraction of the substrate 2 is substantially equal to the index of refraction of the binder 7.

Still referring to FIG. 2, an optical conduit 210 guides the light beam 220 from a light source 216 to a reflector 204. The reflector 204 then directs the light beam 220 to the layer 202. The reflecting surface 214 of the reflector 204 may be made mirror-like by depositing a metal coating such as aluminum or chromium onto the surface 214 via, e.g., evaporation. Alternatively, the reflective surface 214 may be a highly polished piece of metal or metal alloy, such as silver, chromium, aluminum, copper, tin, lead or gold. In other embodiments, surface 214 comprises a material that has a refractive index sufficiently different from the refractive index of the optical conduit 210 to cause light to be totally internally reflected. The shape of the surface 214 may be particularly configured in order to provide uniform illumination over the surface of the display medium 3. Specific modifications can be made by recognizing that the light source 216 is imaged onto the display surface in a way defined by the position and orientation of all the sections of the reflecting surface. A flat reflecting surface, for example, may give more illumination to regions near the reflecting element than far away. By slightly curving the reflecting surface, more of the light could be brought to further regions of the display. The result would be more uniform illumination across the display surface.

Matching the refractive indices of the layer 202, adhesive 208, and the substrate 2 minimizes any additional interfaces that could contribute to undesirable reflection of light back towards the viewer. This refractive index matching does not have to be perfect. Slight differences will cause slight light bending and very small amounts of additional back-reflection. However, if the refractive index differences between the sheet 200, adhesive 204, and the substrate 2 are small, as mentioned above, the incremental back reflection will be negligible.

Figure 3:
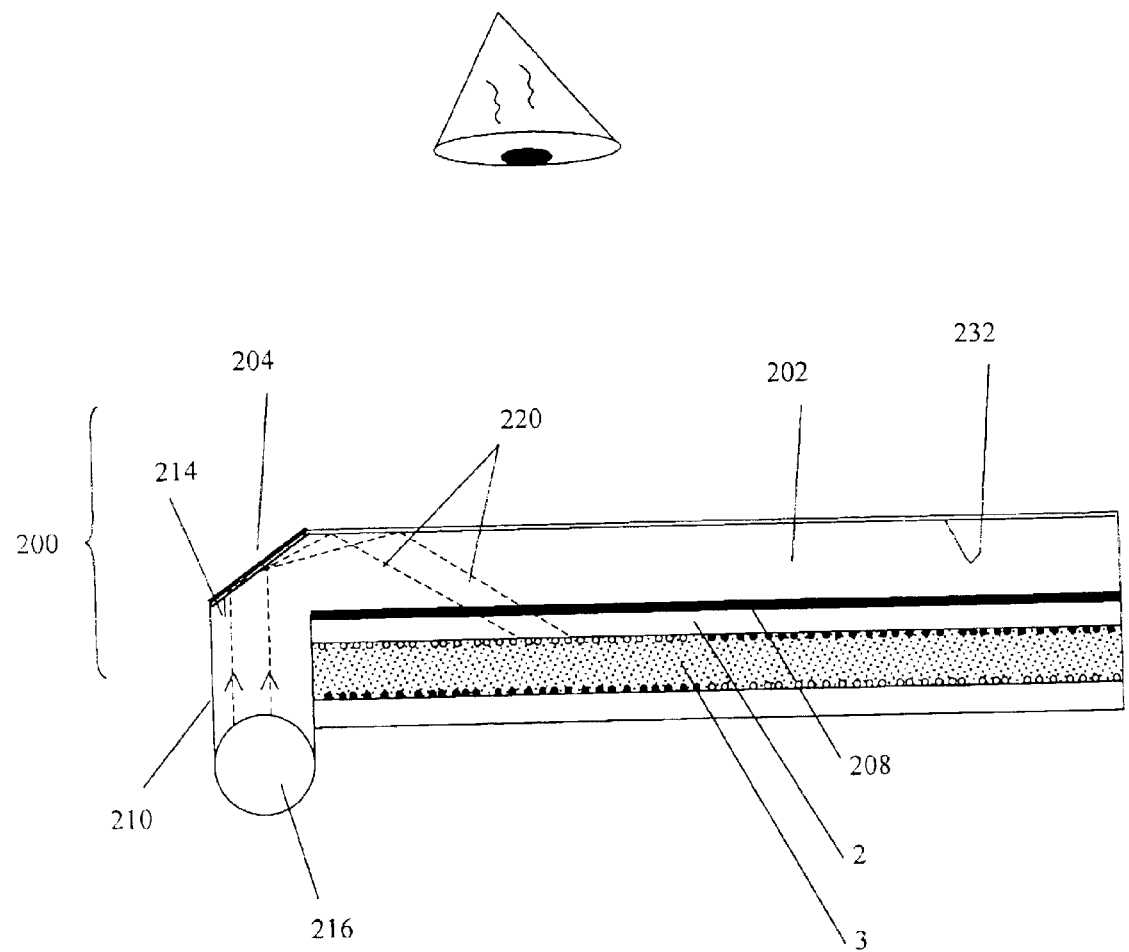
FIG. 3 depicts another embodiment of a frontlighting system in which light reflects once before illuminating the display medium.

Referring to FIG. 3, in another embodiment of the invention, the light beam 220 bounces off the upper surface 232 of the layer 202 once before impinging upon the display medium 3. This may be especially advantageous for larger displays, for example, displays that exceed about three inches in the direction of light travel through the front light, because the bounce allows light to travel further before impinging on the display 3. In one variation of this embodiment of the invention, the surface 232 of the layer 202 is internally reflective.

Figure 4:
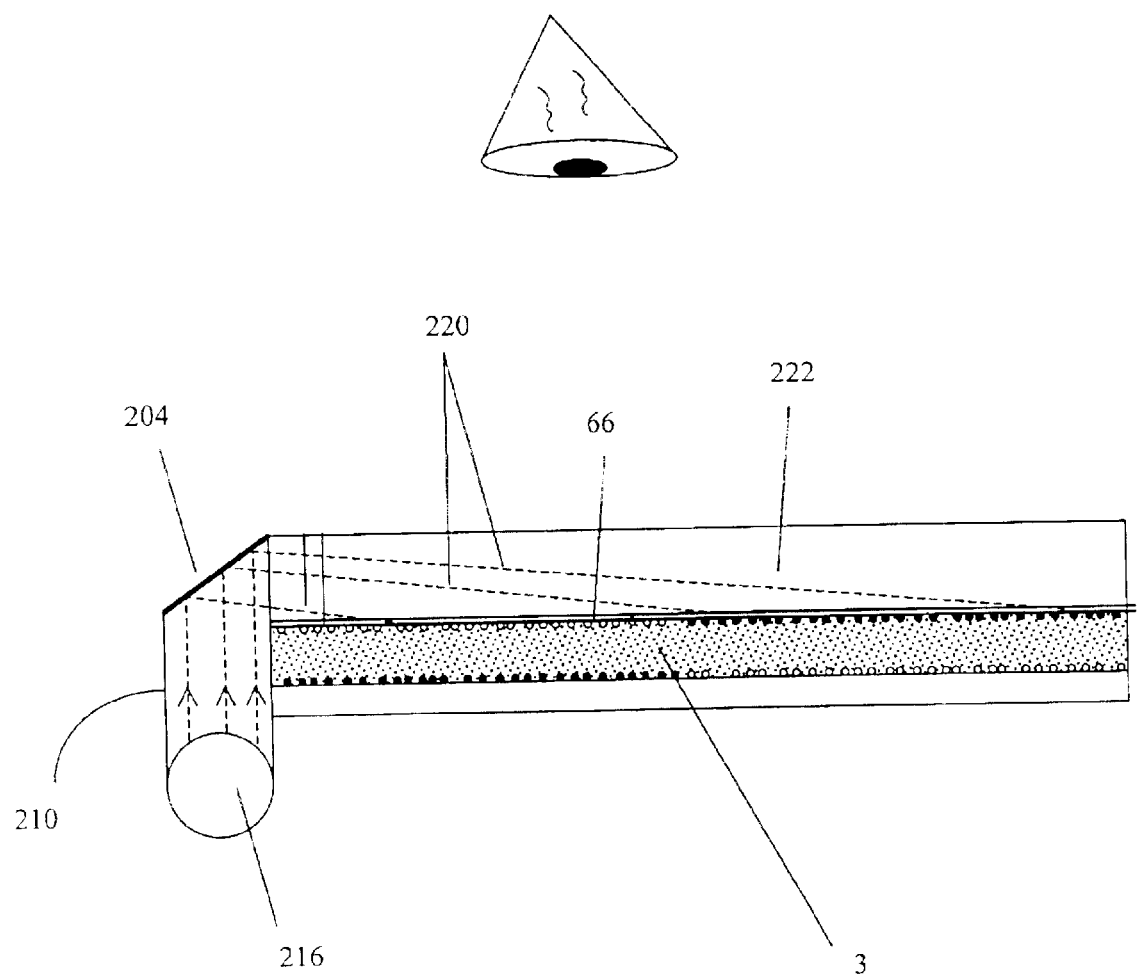
FIG. 4 depicts an embodiment of a frontlighting system having simplified construction.

Referring to FIG. 4, in a particular embodiment of the invention, the layer 202 is merged with the substrate 2 into a single transparent sheet 222, which obviates any need for an adhesive layer 208. In this embodiment, the inner surface of the sheet 222 is coated an transparent electrically conducting layer such as indium tin oxide or a conductive organic material deposited from solution.

Figure 5:
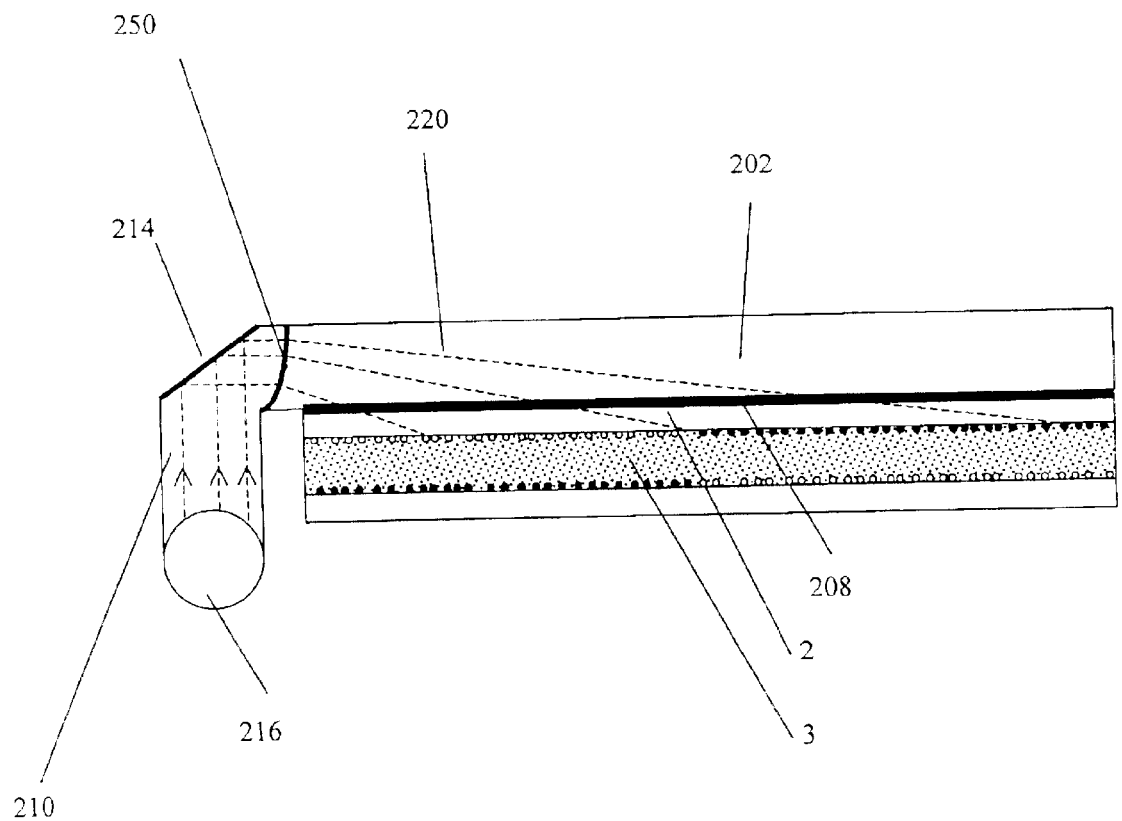
FIGS. 5 and 6 depict embodiments of a frontlighting system in which the light sheet is formed of two different materials.
Figure 6:
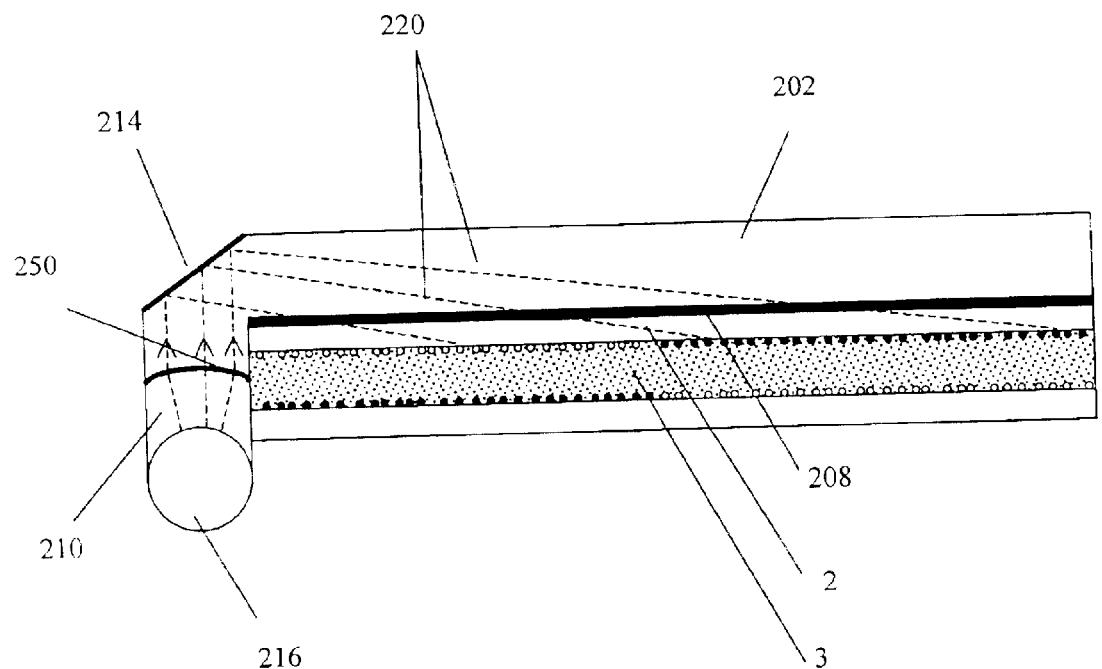

As mentioned above, the shape of the surface of the reflector may be specifically configured in order to provide uniform illumination over the surface of the display medium 3. Alternatively, referring now to FIGS. 5–6, in another embodiment of the invention, a lens structure 250 is used to simplify the design of the reflective surface 214. By choosing a lens structure such that the light source 216 is at the focal point, the light enters the layer 202 in a collinear fashion. In this embodiment, a flat mirrored surface 214 of the reflector 204 provides substantially uniform illumination across a planar surface of the display medium. For example, if the mirror surface 214 is diposed at 45 degrees with respect to the vertical (direction of incident light) then the light will be projected completely horizontally. By choosing a mirror angle slightly below 45 degrees, the light is projected uniformly across a finite range on the horizontal plane. Thus, as will be appreciated by skilled artisans, the mirror angle and the dimensions of the reflector 204 can be chosen to match that area of uniform light distribution with the surface of the display medium 3. The lens structure 250 may be on a piece of glass or transparent plastic inserted between the optical conduit 210 and the layer 202, or it may be formed by the interface of the layer 202 and the optical conduit 210 when these structures have dissimilar indices of refraction. While any dissimilarity is sufficient to induce some lensing, it is preferred that the materials differ in refractive index by at least about 0.01, and preferably about 0.1. However formed, the lens 250 may re-direct light to give a more uniform illumination over the display surface.

In various embodiments of the invention, particular shaping of the reflective surface 214 or lens 250 is critical to facilitate uniform illumination. The shape of the surfaces control how the light intensity is distributed across the display. Calculating the advantageous shape is best accomplished using ray-tracing computations, according to methods known in the art. Without internal lensing, it will generally be advantageous to choose a non-planar shape for the mirror surface. In one embodiment, to determine the optimal shape one begins by recognizing that for each small piece of the mirror and small bundle of light from the lamp, the portion of the display that is illuminated is determined by the angle of approach of the light bundle, the horizontal and vertical positions of the reflective segment, and the angle of the segment. The intensity of light on any given portion of the display is a sum of intensities of all the light bundles from the light sources that cause light to be projected onto that portion of the display. Most optimal shape of the reflective surface can be determined by starting with a flat surface tilted at about 45 degrees, and then gradually increasing curvature of the surface and/or tilt to bring more light to the regions that are more poorly illuminated and less light to the regions that get more than average illumination. One could iterate until acceptable illumination uniformity is achieved. Known molding processes can be used to manufacture the reflective surface and/or lens of desired configuration.

Other embodiments incorporating the concepts disclosed herein may be used without departing from the spirit and scope of the invention. The described embodiments are to be considered in all respects as only illustrative and not restrictive. Therefore, it is intended that the scope of the invention be only limited by the following claims.

What is claimed is:

1. An electronic display, comprising:
   a nonemissive electro-optic display medium comprising a binder phase; and
   a light transmissive element having a first surface, the first surface adjacent the nonemissive electro-optic display medium, wherein the propagation of light directed through the light transmissive element towards the nonemissive electro-optic display medium is substantially undeflected at an interface between the first surface of the light transmissive element and the nonemissive electro-optic display medium, wherein the nonemissive electro-optic display medium comprises a binder phase having a first index of refraction and wherein the light transmissive element has a second index of refraction, the second index of refraction being substantially equal to the first index of refraction.

2. The electronic display of claim 1 wherein the nonemissive electro-optic display medium is selected from the group consisting of: an electrochromic display medium, a microcell electrophoretic display medium, and a rotating bichromal member display medium.

3. The electronic display of claim 2, wherein the microcell electrophoretic display medium comprises at least one cavity formed in a carrier medium, the at least one cavity containing at least one charged particle and a suspending fluid.

4. The electronic display of claim 1 wherein the nonemissive electro-optic display medium comprises a microencapsulated electrophoretic display medium.

5. The electronic display of claim 4 wherein the microencapsulated electrophoretic display medium comprises at least one capsule dispersed in the binder phase, the at least one capsule containing an electrophoretic contrast medium phase that includes at least one particle and a suspending fluid.

6. The electronic display of claim 1 wherein the first surface of the light transmissive element comprises an electrically conductive coating.

7. The electronic display of claim 6 wherein the electrically conductive coating comprises indium tin oxide.

8. The electronic display of claim 1 wherein the first surface of the light transmissive element is substantially planar.

9. The electronic display of claim 1 wherein the first surface of the light transmissive element is substantially void of surface elements.

10. The electronic display of claim 1, further comprising a light source for generating light for transmission through the light transmissive element, the light source in optical communication with the light transmissive element.

11. The electronic display of claim 10 wherein the light source is selected from the group consisting of a cold cathode fluorescent lamp, an SMT incandescent lamp, and a light emitting diode.

12. An electronic display, comprising:
a nonemissive electro-optic display, medium; and
a light transmissive element, comprising:
  a first surface, the first surface adjacent the nonemissive electro-optic display medium, wherein the propagation of light directed through the light transmissive element towards the nonemissive electro-optic display medium is substantially undeflected at an interface between the first surface of the light transmissive element and the nonemissive electro-optic display medium; and
  a second surface opposite the first surface, the second surface comprising a reflective coating for internal reflection of light towards the nonemissive electro-optic display medium.

13. The electronic display of claim 12 wherein the nonemissive electro-optic display medium is selected from the group consisting of: an electrochromic display medium, a microcell electrophoretic display medium, and a rotating bichromal member display medium.

14. The electronic display of claim 13, wherein the microcell electrophoretic display medium comprises at least one cavity formed in a carrier medium, the at least one cavity containing at least one charged particle and a suspending fluid.

15. The electronic display of claim 12 wherein the nonemissive electro-optic display medium comprises a microencapsulated electrophoretic display medium.

16. The electronic display of claim 15 wherein the microencapsulated electrophoretic display medium comprises at least one capsule dispersed in the binder phase, the at least one capsule containing an electrophoretic contrast medium phase that includes at least one particle and a suspending fluid.

17. The electronic display of claim 12 wherein the first surface of the light transmissive element comprises an electrically conductive coating.

18. The electronic display of claim 17 wherein the electrically conductive coating comprises indium tin oxide.

19. The electronic display of claim 12 wherein the first surface of the light transmissive element is substantially planar.

20. The electronic display of claim 12 wherein the first surface of the light transmissive element is substantially void of surface elements.

21. The electronic display of claim 12 further comprising a light source for generating light for transmission through the light transmissive element, the light source in optical communication with the light transmissive element.

22. The electronic display of claim 21 wherein the light source is selected from the group consisting of a cold cathode fluorescent lamp, an SMT incandescent lamp, and a light emitting diode.

23. An electronic display comprising:
a nonemissive electro-optic display medium;
a light transmissive element having a first surface, the first surface adjacent the nonemissive electro-optic display medium, wherein the propagation of light directed through the light transmissive element towards the nonemissive electro-optic display medium is substantially undeflected at an interface between the first surface of the light transmissive element and the nonemissive electro-optic display medium; and
a substantially transparent substrate disposed between the light transmissive element and the nonemissive electro-optic display medium.

24. The electronic display of claim 23 wherein the substrate comprises an electrically conductive coating at the interface with the nonemissive electro-optic display medium.

25. The electronic display of claim 23 wherein the substrate has a first index of refraction and the light transmissive element has a second index of refraction, the first index of refraction being substantially equal to the second index of refraction.

26. The electronic display of claim 23, wherein the nonemissive electro-optic display medium is selected from the group consisting of: an electrochromic display medium, a microcell electrophoretic display medium, and a rotating bichromal member display medium.

27. The electronic display of claim 26, wherein the microcell electrophoretic display medium comprises at least one cavity formed in a carrier medium, the at least one cavity containing at least one charged particle and a suspending fluid.

28. The electronic display of claim 23 wherein the nonemissive electro-optic display medium comprises a microencapsulated electrophoretic display medium.

29. The electronic display of claim 28 wherein the micro encapsulated electrophoretic display medium comprises at least one capsule dispersed in the binder phase, the at least one capsule containing an electrophoretic contrast medium phase that includes at least one particle and a suspending fluid.

30. The electronic display of claim 23 wherein the first surface of the light transmissive element comprises an electrically conductive coating.

31. The electronic display of claim 30 wherein the electrically conductive coating comprises indium tin oxide.

32. The electronic display of claim 23 wherein the first surface of the light transmissive element is substantially planar.

33. The electronic display of claim 23 wherein the first surface of the light transmissive element is substantially void of surface elements.

34. The electronic display of claim 23 further comprising a light source for generating light for transmission through the light transmissive element, the light source in optical communication with the light transmissive element.

35. The electronic display of claim 34 wherein the light source is selected from the group consisting of a cold cathode fluorescent lamp, an SMT incandescent lamp, and a light emitting diode.

36. An electronic display, comprising:
a nonemissive electro-optic display medium comprising a binder phase; and
a light transmissive element, wherein the light transmissive element comprises:
  a first component having a first surface adjacent the nonemissive electro-optic display medium, wherein the propagation of light directed through the light transmissive element towards the nonemissive electro-optic display medium is substantially undeflected at an interface between the first surface of the light transmissive element and the nonemissive electro-optic display medium; and a second component having a second surface, wherein the second surface mates with the first surface so that the first component and the second component form a lens at the interface therebetween for facilitating substantially uniform illumination of the nonemissive electro-optic medium.

37. The electronic display of claim 36 wherein the first component and the second component have dissimilar indices of refraction.

38. The electronic display of claim 36 further comprising a light source for generating light for transmission through the light transmissive element, the light source in optical communication with the light transmissive element.

39. The electronic display of claim 38, wherein the light source is selected from the group consisting of a cold cathode fluorescent lamp, an SMT incandescent lamp, and a light emitting diode.

40. The electronic display of claim 36 wherein the nonemissive electro-optic display medium is selected from the group consisting of: an electrochromic display medium, a microcell electrophoretic display medium, and a rotating bichromal member display medium.

41. The electronic display of claim 40, wherein the microcell electrophoretic display medium comprises at least one cavity formed in a carrier medium, the at least one cavity containing at least one charged particle and a suspending fluid.

42. The electronic display of claim 36 wherein the nonemissive electro-optic display medium comprises a microencapsulated electrophoretic display medium.

43. The electronic display of claim 42 wherein the microencapsulated electrophoretic display medium comprises at least one capsule dispersed in the binder phase, the at least one capsule containing an electrophoretic contrast medium phase that includes at least one particle and a suspending fluid.

44. The electronic display of claim 36 wherein the first surface of the light transmissive element comprises an electrically conductive coating.

45. The electronic display of claim 44 wherein the electrically conductive coating comprises indium tin oxide.

46. The electronic display of claim 36 wherein the first surface of the light transmissive element is substantially planar.

47. The electronic display of claim 36 wherein the first surface of the light transmissive element is substantially void of surface elements.

48. An electronic display, comprising:

a nonemissive electro-optic display medium;

a light transmissive element having a first surface adjacent the nonemissive electro-optic display medium, wherein the propagation of light directed through the light transmissive element towards the nonemissive electro-optic display medium is substantially undeflected at an interface between the first surface of the light transmissive element and the nonemissive electro-optic display medium; and a light source for generating light for transmission through the light transmissive element, the light source in optical communication with the light transmissive element, wherein the light source is coupled to a photodetector.

49. The electronic display of claim 48, wherein the light source is activated when the level of ambient light drops below a predetermined value.

50. The electronic display of claim 48 wherein the nonemissive electro-optic display medium is selected from the group consisting of: an electrochromic display medium, a microcell electrophoretic display medium, and a rotating bichromal member display medium.

51. The electronic display of claim 50, wherein the microcell electrophoretic display medium comprises at least one cavity formed in a carrier medium, the at least one cavity containing at least one charged particle and a suspending fluid.

52. The electronic display of claim 48 wherein the nonemissive electro-optic display medium comprises a microencapsulated electrophoretic display medium.

53. The electronic display of claim 52 wherein the microencapsulated electrophoretic display medium comprises at least one capsule dispersed in the binder phase, the at least one capsule containing an electrophoretic contrast medium phase that includes at least one particle and a suspending fluid.

54. The electronic display of claim 48 wherein the first surface of the light transmissive element comprises an electrically conductive coating.

55. The electronic display of claim 54 wherein the electrically conductive coating comprises indium tin oxide.

56. The electronic display of claim 48 wherein the first surface of the light transmissive element is substantially planar.

57. The electronic display of claim 48 wherein the first surface of the light transmissive element is substantially void of surface elements.

58. The electronic display of claim 48 wherein the light source is selected from the group consisting of a cold cathode fluorescent lamp, an SMT incandescent lamp, and a light emitting diode.

59. The electronic display of claim 58 wherein the light source is selected from the group consisting of a cold cathode fluorescent lamp, an SMT incandescent lamp, and a light emitting diode.

60. An electronic display, comprising:

a nonemissive electro-optic display medium;

a light transmissive element having a first surface, the first surface adjacent the nonemissive electro-optic display medium, wherein the propagation of light directed through the light transmissive element towards the nonemissive electro-optic display medium is substantially undeflected at an interface between the first surface of the light transmissive element and the nonemissive electro-optic display medium;

a light source for generating light for transmission through the light transmissive element, the light source in optical communication with the light transmissive element; and a reflector for directing light from the light source through the light transmissive element.

61. The electronic display of claim 60 wherein the reflector comprises a non-planar surface of a predetermined configuration for facilitating substantially uniform illumination of the nonemissive electro-optic medium.

62. The electronic display of claim 60 wherein the surface of the reflector comprises a plurality of surface elements.

63. The electronic display of claim 60 further comprising a optical conduit disposed between the light source and the reflector.

64. The electronic display of claim 63 wherein the optical conduit comprises a lens internally formed therein.

65. The electronic display of claim 60 wherein the nonemissive electro-optic display medium is selected from the group consisting of: an electrochromic display medium, a microcell electrophoretic display medium, and a rotating bichromal member display medium.

66. The electronic display of claim 65, wherein the microcell electrophoretic display medium comprises at least one cavity formed in a carrier medium, the at least one cavity containing at least one charged particle and a suspending fluid.

67. The electronic display of claim 60 wherein the nonemissive electro-optic display medium comprises a microencapsulated electrophoretic display medium.

68. The electronic display of claim 67 wherein the microencapsulated electrophoretic display medium comprises at least one capsule dispersed in the binder phase, the at least one capsule containing an electrophoretic contrast medium phase that includes at least one particle and a suspending fluid.

69. The electronic display of claim 60 wherein the first surface of the light transmissive element comprises an electrically conductive coating.

70. The electronic display of claim 69 wherein the electrically conductive coating comprises indium tin oxide.

71. The electronic display of claim 60 wherein the first surface of the light transmissive element is substantially planar.

72. The electronic display of claim 60 wherein the first surface of the light transmissive element is substantially void of surface elements.

73. An electronic display, comprising:
a nonemissive electro-optic display medium;
a light transmissive element having a first surface, the first surface adjacent the nonemissive electro-optic display medium;
a light source in optical communication with the light transmissive element;
a reflector for directing light from the light source through the light transmissive element, the reflector configured to facilitate substantially uniform illumination of the nonemissive electro-optic display medium.

74. The electronic display of claim 73 wherein the nonemissive electro-optic display medium is selected from the group consisting of: an electrochromic display medium, a microcell electrophoretic display medium, and a rotating bichromal member display medium.

75. The electronic display of claim 74 wherein the microcell electrophoretic display medium comprises at least one cavity formed in a carrier medium, the at least one cavity containing at least one charged particle and a suspending fluid.

76. The electronic display of claim 73 wherein the nonemissive electro-optic display medium comprises a microencapsulated electrophoretic display medium.

77. The electronic display of claim 76 wherein the microencapsulated electrophoretic display medium comprises at least one capsule dispersed in the binder phase, the at least one capsule containing an electrophoretic contrast medium phase that includes at least one particle and a suspending fluid.

78. The electronic display of claim 73 wherein the first surface of the light transmissive element comprises an electrically conductive coating.

79. The electronic display of claim 78 wherein the electrically conductive coating comprises indium tin oxide.

80. The electronic display of claim 73 wherein the nonemissive electro-optic display medium comprises a binder phase having a first index of refraction and wherein the light transmissive element has a second index of refraction, the second index of refraction being substantially equal to the first index of refraction.

81. The electronic display of claim 73 wherein the first surface of the light transmissive element is substantially planar.

82. The electronic display of claim 73 wherein the first surface of the light transmissive element is substantially void of surface elements.

83. The electronic display of claim 73 wherein the light transmissive element further has a second surface opposite the first surface, the second surface comprising a reflective coating for internal reflection of light towards the nonemissive electro-optic display medium.

84. The electronic display of claim 73 further comprising a substantially transparent substrate disposed between the light transmissive element and the nonemissive electro-optic display medium.

85. The electronic display of claim 84 wherein the substrate comprises an electrically conductive coating at the interface with the nonemissive electro-optic display medium.

86. The electronic display of claim 84 wherein the substrate has a first index of refraction and the light transmissive element has a second index of refraction, the first index of refraction being substantially equal to the second index of refraction.

87. The electronic display of claim 73 wherein the light transmissive element comprises:
a first component having a first surface; and
a second component having a second surface, wherein the second surface mates with the first surface so that the first component and the second component form a lens at the interface therebetween for facilitating substantially uniform illumination of the nonemissive electro-optic medium.

88. The electronic display of claim 87 wherein the first component and the second component have dissimilar indices of refraction.

89. The electronic display of claim 73, wherein the light source is selected from the group consisting of a cold cathode fluorescent lamp, an SMT incandescent lamp, and a light emitting diode.

90. The electronic display of claim 73, wherein the light source is coupled to a photodetector.

91. The electronic display of claim 90, wherein the light source is activated when the level of ambient light drops below a predetermined value.

92. The electronic display of claim 73 wherein the reflector comprises a non-planar surface of a predetermined configuration.

93. The electronic display of claim 73 wherein the surface of the reflector comprises a plurality of surface elements.

94. The electronic display of claim 73 further comprising a optical conduit disposed between the light source and the reflector.

95. The electronic display of claim 94 wherein the optical conduit comprises a lens internally formed therein.

* * * * *